(12) United States Patent
Takeuchi

(10) Patent No.: US 6,745,610 B2
(45) Date of Patent: Jun. 8, 2004

(54) METHOD OF MANUFACTURING ARM

(75) Inventor: Shigeo Takeuchi, Hamamatsu (JP)

(73) Assignee: Kabushiki Kaisha Somic Ishikawa, Tokyo (JP)

( * ) Notice: Subject to any disclaimer, the term of this patent is extended or adjusted under 35 U.S.C. 154(b) by 0 days.

(21) Appl. No.: 10/221,489

(22) PCT Filed: Feb. 9, 2001

(86) PCT No.: PCT/JP01/00929

§ 371 (c)(1),
(2), (4) Date: Sep. 13, 2002

(87) PCT Pub. No.: WO02/45981

PCT Pub. Date: Jun. 13, 2002

(65) Prior Publication Data

US 2003/0074778 A1 Apr. 24, 2003

(30) Foreign Application Priority Data

Dec. 5, 2000 (JP) ........................................ 2000-369499

(51) Int. Cl.⁷ .............................................. B21C 37/16
(52) U.S. Cl. .................................. 72/370.25; 72/370.24
(58) Field of Search ........................... 72/367.1, 370.02, 72/370.03, 370.1, 370.23, 370.24, 370.25; 74/492, 579 R, 586; 29/896.7, 897.2

(56) References Cited

U.S. PATENT DOCUMENTS 6,038,771 A   3/2000  Takehara et al.
6,105,413 A * 8/2000  Duggan et al. ............ 72/370.1

FOREIGN PATENT DOCUMENTS

| DE | 196 45 410 A1 | 6/1997 |
| JP | 2-20612 | 1/1990 |
| JP | 4-173476 | 6/1992 |
| JP | 7-37862 | 7/1995 |
| JP | 9-183385 | 7/1997 |
| JP | 10-190601 | 7/1997 |
| JP | 9-242743 | 9/1997 |

* cited by examiner

*Primary Examiner*—Lowell A. Larson
(74) *Attorney, Agent, or Firm*—Morrison & Foerster LLP

(57) ABSTRACT

While one end of a material (31) that has nearly the same diameter as that of a first connecting portion (15) is secured, pressure is applied to the portion between the middle and the other end of the material (31). A slender portion (32), which has nearly the same diameter as that of a buckle portion (18), is formed adjacent to said other end of the material (31), and a stepped portion (20) is formed adjacent to the slender portion (32). Thus, a first-stage unfinished body (33) is formed. By radially enlarging a part of the slender portion (32), i.e. the portion between the distal end and the portion to become a buckle portion (18), until the diameter of said part becomes nearly the same as the diameter of a second connecting portion (16), the portion to become the second connecting portion (16) is formed. Thus, an arm-to-be portion is formed, wherein the portion that has not been enlarged shall be formed into the buckle portion (18). With external threads (17) formed along the cylindrical outer surface of the expanded portion, formation of the arm (5) is completed. The invention enables the reliable formation of a buckle portion (18) having a given length, resulting in stable production of arms (5) having a uniform buckling strength. The invention enables the easy production of an arm (5) regardless of whether the two ends of the arm (5) have different diameters.

4 Claims, 3 Drawing Sheets

METHOD OF MANUFACTURING ARM

TECHNICAL FIELD

The present invention relates to a method of producing a tube-shaped arm having a buckle portion and adapted to be connected to an adaptor portion and a connectable member.

BACKGROUND OF THE INVENTION

Various arms are known conventionally, including a suspension arm of an automobile and a tie rod of a steering mechanism. These arms typically have a tubular shape, with a ball joint attached to one end, and a cylindrical shaft supporting portion having a rubber bush attached to the other end. There are various conventionally known examples of a tubular-arm to which such a ball joint and a shaft supporting portion shall be connected with a given distance between the ball joint and the shaft supporting portion.

As is true with an arm disclosed in Japanese Patent Provisional Publication No. 1997-183385, these arms typically have a buckle portion for protecting the other part of the arm by buckling when receiving an external load greater than a given value.

To be more specific, an arm disclosed in Japanese Patent Provisional Publication No. 1997-183385 is a part of a rack-and-pinion steering mechanism and includes a shaft-supporting portion, a ball joint as a supporting portion, and an arm to be used as a tie rod. The shaft-supporting portion has a cylindrical portion and external threads. A rubber bush to which a rack shaft as an adaptor portion will be attached is contained in the cylindrical portion. The ball joint is adapted to be attached to a knuckle member for supporting wheels. The shaft-supporting portion and the ball joint are respectively connected to the two opposing ends of the arm.

The arm is formed in a generally cylindrical shape and has a first connecting portion at one end and a second connecting portion at the other end. Internal threads to be engaged with the external threads of the shaft-supporting portion are formed in the cylindrical inner surface of the first connecting portion. Internal threads to be engaged with the external threads of the ball joint are formed in the cylindrical inner surface of the second connecting portion. A buckle portion which is smaller in diameter and adapted to buckle when receiving a load greater than a given value is provided at the axial middle of the arm. The arm is produced by using a material having the same diameter as that of the first connecting portion and the second connecting portion. The buckle portion of the arm, which is smaller in diameter than the other part of the arm and has a hexagonal outer shape, is formed by applying pressure to the axial middle of the material from the outer surface towards the center of the material, while securing both ends of the material.

As the buckle portion of the arm disclosed in Japanese Patent Provisional Publication No. 1997-183385 is formed by applying pressure to the axial middle of the material from the outer surface, there is the possibility of parts of the first connecting portion and the second connecting portion, i.e. the parts adjacent to the buckle portion, becoming narrower together with the buckle portion, during the process of forming the buckle portion. This may prevent production of buckle portions having a given, uniform axial length, making it difficult to achieve a stable buckling strength. In other words, in order to enable the production of buckle portions having a given, uniform axial length, it is necessary to prevent undesirable deformation of the parts of the first connecting portion and the second connecting portion adjacent to the buckle portion by, for example, inserting insert dies or similar members into the first connecting portion and the second connecting portion so as to prevent reduction of the diameter of the parts of the first connecting portion and the second connecting portion adjacent to the buckle portion. This, however, may complicate the production of the arm.

As its first connecting portion and second connecting portion have nearly the same diameter, the conventional arm described above cannot be connected to a shaft supporting portion and a ball joint that are provided with external thread portions having different diameters.

In order to solve the above problem, an object of the present invention is to provide an arm production method which enables the easy and reliable production of an arm having a given, uniform buckling strength.

DISCLOSURE OF THE INVENTION

The present invention provides a method of producing an arm which will be connected to an adaptor portion and a connectable member and includes a tubular first connecting portion provided at one end of the arm and adapted to be connected to said adaptor portion, a tubular second connecting portion provided at the other end of the arm and adapted to be connected to said connectable member, and a buckle portion which is smaller in diameter than the first connecting portion as well as the second connecting portion and provided between the first connecting portion and the second connecting portion so as to buckle when a load greater than a given value is applied to the first connecting portion or the second connecting portion, said method calling for forming an unfinished body by narrowing one end portion of a tubular material that has a diameter corresponding to that of either one of the first connecting portion or the second connecting portion so as to form said one end portion into a small diameter portion having a diameter corresponding to that of said buckle portion, and radially enlarging the portion between the end of the slender portion of the unfinished body and the portion of the slender portion to be formed into the buckle portion so as to increase the diameter to correspond to the diameter of the other one of the first connecting portion or the second connecting portion, i.e. the connecting portion having a diameter different from that of the material. By forming an unfinished body by narrowing one end portion of a tubular material having a diameter corresponding to either one of the first connecting portion or the second connecting portion so as to form said one end portion into a small diameter portion having a diameter corresponding to that of said buckle portion, and radially enlarging the portion between the end of the slender portion of the unfinished body and the portion of the slender portion to be formed into the buckle portion so as to increase the diameter to correspond to the diameter of the other one of the first connecting portion or the second connecting portion, the invention enables the reliable formation of a buckle portion having a given length and the stable production of arms having a uniform buckling strength.

A method of producing an arm according to another feature of the invention is characterized in that the first connecting portion and the second connecting portion have different diameters and that the method calls for use of a material having a diameter that corresponds to the greater of the diameters of the first connecting portion and the second connecting portion. By using a material having a diameter that corresponds to that of the greater of the diameters of the first connecting portion and the second connecting portion, the arm is formed based on the greater of the diameters of the two connecting portions. Therefore, the invention is effective in reducing the proportion by which the diameter of the slender portion of the unfinished body is increased, thereby facilitating the production of the mold for radially enlarging the slender portion and consequently improving the manufacturability of the entire arm.

A method of producing an arm according to yet another feature of the invention is characterized in that a stepped portion having a tubular shape with a diameter greater than the buckle portion is formed between the buckle portion and at least one of the two connecting portions, i.e. the first connecting portion and the second connecting portion, by narrowing the corresponding portion or portions of the material. By the feature described above, which calls for forming a stepped portion having a tubular shape with a diameter greater than the buckle portion between the buckle portion at least one of the two connecting portions, the invention enables the formation of a buckle port that is ensured to have a given buckling strength regardless of whether the diameter of the buckle portion is greatly different from that of the first connecting portion or the second connecting portion.

A method of producing an arm according to yet another feature of the invention is characterized in that the first connecting portion and the second connecting portion have different diameters and that external threads to be engaged with either one of the adaptor portion or the connectable member are formed along the cylindrical outer surface of the connecting portion that has the smaller diameter. As external threads to be engaged with either the adaptor portion or the connectable member are formed along the cylindrical outer surface of the connecting portion that has the smaller diameter, the area of the threads to be formed is small in comparison with a structure that calls for threading the larger connecting portion. Therefore, the invention facilitates threading operation, thereby improving the manufacturability of the arm.

PREFERRED EMBODIMENT OF THE INVENTION

Figure 1:
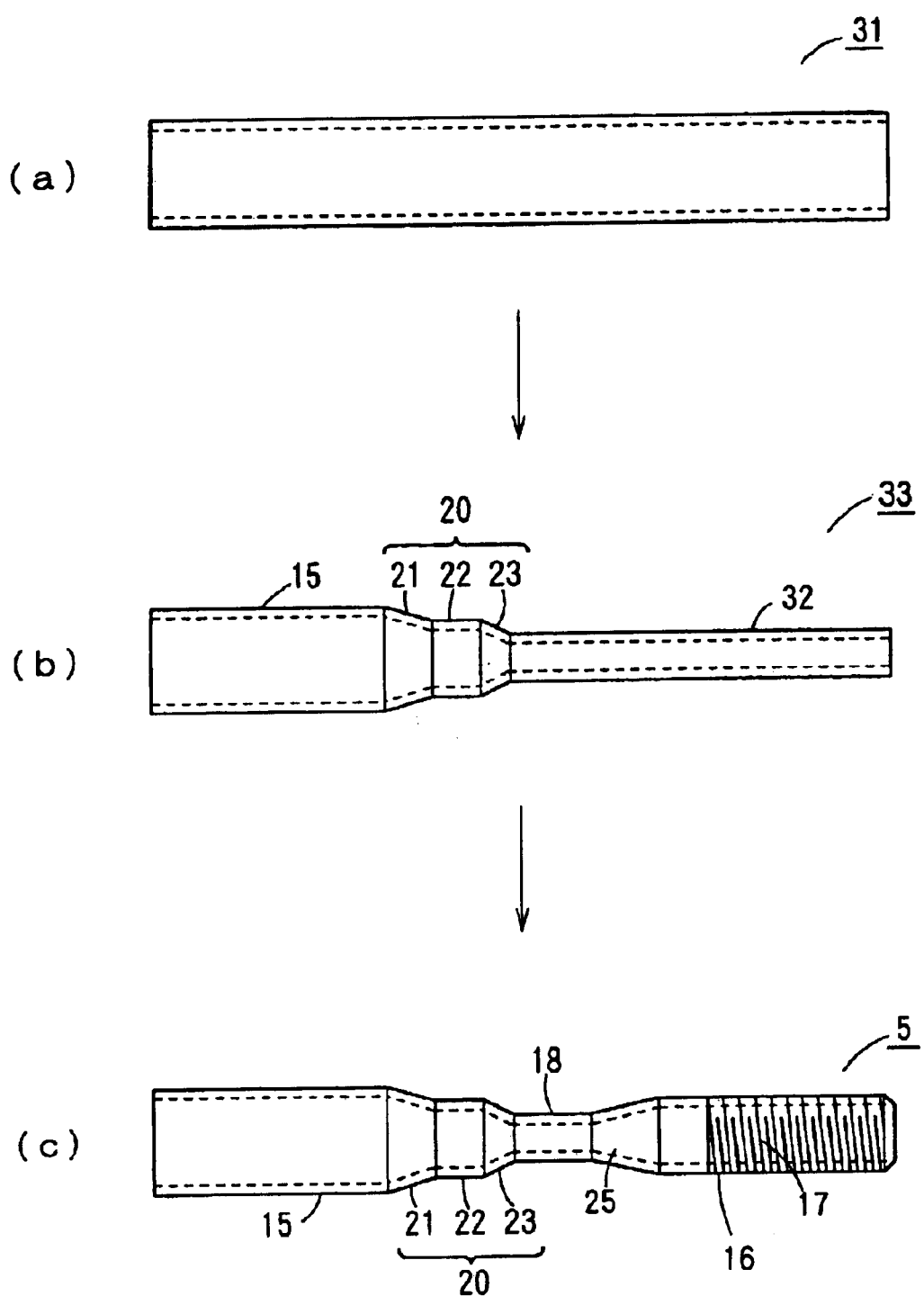
FIG. 1 is a process drawing showing the process of producing an arm by an arm production method according to an embodiment of the present invention, wherein (a) is a side view of the material, (B) a side view of an unfinished body, and (C) a side view of the arm.

Next, the configuration of an arm production method according to an embodiment of the present invention is explained hereunder, referring to the drawings.

Figure 2:
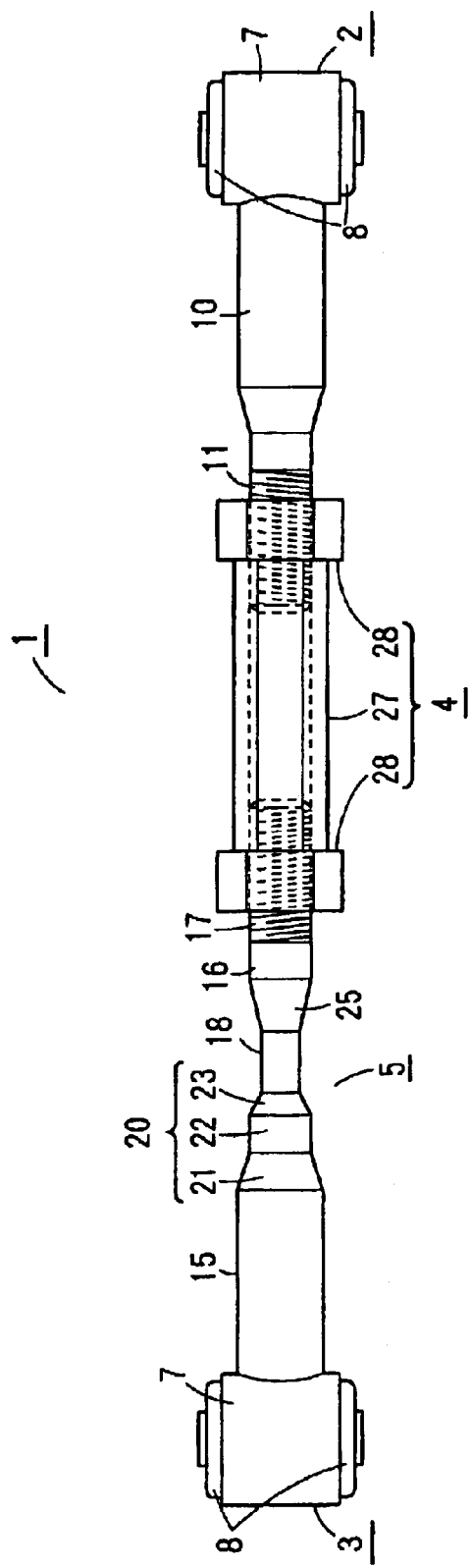
FIG. 2 is a side view of a connecting device provided with an arm produced by said arm production method.

Referring to FIG. 2, numeral 1 denotes a connecting device to be used in, for example, a suspension arm of an automobile.

The connecting device 1 has a pair of shaft-supporting portions 2, 3 serving as adaptor portions. The connecting device 1 also has an arm 5 provided with a connector portion 4, which may be made of an adjusting tube or the like and serves as a connectable member. The aforementioned shaft-supporting portion 3 is attached to an end of the arm 5, and the connector portion 4 is attached to the other end of the arm 5 in the state that the shaft-supporting portion 2 is attached to the opposite end of the connector portion 4.

Each one of the two shaft-supporting portions 2,3 has a cylindrical portion 7 made of metal. A rubber bush 8 is provided inside each cylindrical portion 7. The rubber bush 8 may consist of an inner cylinder and rubber bonded to the inner cylinder by vulcanization. The shaft-supporting portion 2 is integrally provided with a cylindrical connecting arm portion 10, which projects from the cylindrical outer surface of the cylindrical portion 7 in the direction parallel to the diameter of the cylindrical portion 7. External threads 11 are formed along the cylindrical surface of the end portion of the connecting arm portion 10.

The arm 5 is formed of a metal into a generally cylindrical shape and provided, at one of its axial ends, with a cylindrical first connecting portion 15. The outer edge of the first connecting portion 15 is welded or otherwise joined to the cylindrical outer surface of the cylindrical portion 7 of the shaft-supporting portion 3. A cylindrical second connecting portion 16 is formed at the other axial end of the arm 5. The second connecting portion 16 extends coaxially with the first connecting portion 15. External threads 17 are formed along the cylindrical outer surface of the second connecting portion 16. A cylindrical buckle portion 18 is provided at the axial middle of the arm 5 in such a way as to be coaxial with the first connecting portion 15 and the second connecting portion 16. The outer diameter of the buckle portion 18 is smaller than that of the first connecting portion 15 as well as that of the second connecting portion 16.

A stepped portion 20 is provided between the first connecting portion 15 and the buckle portion 18. The stepped portion 20 is comprised of portions having different diameters, i.e. a first frusto-conical portion 21, a cylindrical small diameter portion 22, and a second frusto-conical portion 23. The first frusto-conical portion 21 extends contiguously from the first connecting portion 15 and gradually narrows towards the buckle portion 18. The small diameter portion 22 extends from the end of the first frusto-conical portion 21 facing towards the buckle portion 18 in such a way as to be coaxial with the first connecting portion 15. The second frusto-conical portion 23 extends contiguously from the small diameter portion 22 to the buckle portion 18 and gradually narrows towards the buckle portion 18.

A third frusto-conical portion 25 is formed between the second connecting portion 16 and the buckle portion 18 in such a manner that one end of the third frusto-conical portion 25 is contiguous with the second connecting portion 16 and that the other end of the third frusto-conical portion 25 is contiguous with the buckle portion 18, with the diameter of the third frusto-conical portion 25 gradually decreasing from the second connecting portion 16 towards the buckle portion 18.

The aforementioned connector portion 4 has a connector body 27, which is made of a metal and has a shape resembling a hexagonal donut. A pair of nuts 28,28 serving as positioning portions are respectively disposed at the two axial ends of the connector body 27. Internal threads (not shown) to be meshingly engaged with the external threads 11 of the connecting arm portion 10 of the shaft-supporting portion 2 are formed in the cylindrical inner surface of one end of the connector body 27. Internal threads (not shown) are formed also in the cylindrical inner surface of the other end of the connector body 27 so that the arm 5 can be connected to the connector body 27 with said internal threads meshingly engaged with the external threads 17 of the second connecting portion 16 of the arm 5. The nuts 28,28 are adapted to be respectively screwed onto the external threads 11 of the connecting arm portion 10 of the shaft-supporting portion 2 and the external threads 17 of the second connecting portion 16 of the arm 5 and abut against the two axial ends of the connector body 27, thereby positioning the external threads 11 of the connecting arm portion 10 and the external threads 17 of the arm 5 in such a state that the external threads 11,17 are prevented from engaging with the internal threads of the connector body 27.

The edge of the first connecting portion 15 of the arm 5 is integrally joined to the cylindrical outer surface of the cylindrical portion 7 of the shaft-supporting potion 3 by welding. The shaft-supporting potion 2 is integrally connected to the connector body 27 with the external threads 11 of the connecting arm portion 10 of the shaft-supporting portion 2 meshingly engaged with the internal threads and the nut 28 that are disposed at one end of the connector body 27. The shaft-supporting potion 3, too, is integrally connected to the connector body 27 with the external threads 17 of the second connecting portion 16 of the arm 5, to which the shaft-supporting potion 3 shall be connected, meshingly engaged with the internal threads and the nut 28 at the other end of the connector body 27. Thus, the connecting device 1 is formed, with the two shaft-supporting potions 2,3 connected through the arm 5 and the connector portion 4 so that there is a given distance between the respective centers of the two shaft-supporting potions 2,3.

Next, the process of producing said arm is explained hereunder, referring to the drawings.

First, as shown in FIG. 1(a), the present embodiment requires use of a material 31, which is formed by cutting to a given length a cylindrical pipe (not shown) having nearly the same diameter as the outer diameter of the first connecting portion 15, which is the greater of the two connection portions of the arm 5. In the state where one end of the material 31 is secured, pressure is applied in the inwardly radial direction to the area from the middle part to the other end of the material 31 so that a stepped portion 20 and a slender portion 32, i.e. the small diameter portion having nearly the same diameter as the buckle portion 18, are formed. As a result, a first-stage unfinished body 33, which is the unfinished body shown in FIG. 1(b) and has the first connecting portion 15 at one end, is formed by pressure formation.

The distal end portion of the slender portion 32 of the first-stage unfinished body 33 is radially enlarged until its outer diameter becomes nearly equal to that of the second connecting portion 16 of the arm 5, while the base end of the slender portion 32, i.e. the portion that is adjacent to the stepped portion 20 and sahll be formed into the buckle portion 18, remains unchanged. As a result, the portion which is not referred to in the drawing and shall become the second connecting portion is formed. Thus, an arm-to-be portion having a slender portion 32 is formed. The slender portion 32 at the base end, which was not enlarged, shall be formed into the buckle portion 18 later.

Thereafter, the second connecting portion 16 is completed, with the external threads 17 formed along the cylindrical outer surface of the aforementioned portion to become the second connecting portion. Thus, formation of the arm 5 shown in FIG. 1(c) is completed.

As described above, a material 31 having an outer diameter corresponding to the outer diameter of the first connecting portion 15, which is the greater of the two connecting portions, is used to form an arm 5. The process of forming the arm 5 is comprised of steps of narrowing one end of the material 31 to form the slender portion 32 having a diameter corresponding to the outer diameter of the buckle portion 18, and radially enlarging the distal end portion of the slender portion 32, i.e. the portion between the distal end and the portion to be formed into the buckle portion 18, until the outer diameter of said distal end portion becomes nearly equal to that of the second connecting portion 16. The process described above ensures reliable formation of a buckle portion 18 having a given length, resulting in stable production of arms 5 having a uniform buckling strength.

Furthermore, as the embodiment enables the easy production of an arm 5 regardless of whether the first connecting portion 15 at one end of the arm 5 and the second connecting portion 16 at the other end of the arm 5 have different diameters, the embodiment is applicable to a wide range of usage.

Another benefit of the embodiment lies in use of a material 31 having an outer diameter corresponding to the outer diameter of the first connecting portion 15, which is the greater of the two connecting portions of the arm 5; the use of such a material 31 reduces the proportion by which the diameter of the slender portion 32 of the unfinished body 33 is increased, thereby facilitating the production of the mold for radially enlarging the slender portion 32 and consequently improving the manufacturability of the entire arm.

The first connecting portion 15, which is the greater of the two connecting portions of the arm 5, is welded to the shaft-supporting potion 3. By means of the external threads 17 formed along the cylindrical outer surface, the second connecting portion 16, which is narrower than the first connecting portion 15, is connected to the connector portion 4 to which the shaft-supporting potion 2 is attached. Thorough welding of the first connecting portion 15, which is the greater of the two connecting portions of the arm 5, ensures that the arm 5 is firmly connected to the shaft-supporting potion 3. As the diameter of the second connecting portion 16 is smaller than that of the first connecting portion 15, the diameter of the connector portion 4, which is adapted to be screwed onto the external threads 17 of the second connecting portion 16, is also reduced. As a result, internal threads to be formed in the connector portion 4, too, are reduced. Therefore, the embodiment not only improves the manufacturability of the connector portion 4 but also facilitates reduction of the weight and dimensions of the connector portion 4.

The first connecting portion 15, the second connecting portion 16, and the buckle portion 18 are coaxially provided. Therefore, these portions have a nearly uniform wall thickness, even though they are formed by narrowing or radially enlarging the tubular material 31. Because of this feature, the embodiment provides an arm having stable characteristics: for example, the buckle portion 18 has a stable bending stress against buckling, or the arm can be reliably connected to the shaft-supporting potions 2,3 at predetermined locations.

Furthermore, providing the stepped portion 20 adjacent to the first connecting portion 15 facilitates the formation of the buckle portion 18 by narrowing the corresponding portion of the material 31 while preventing deformation of the other part of the material. Even in cases where there is a large difference between the diameter of the buckle portion 18 and the diameter of the first connecting portion 15, which is the greater of the two connecting portions of the arm 5, the buckle portion that has the reliable ability of buckling under a load of more than a given value.

Figure 3:
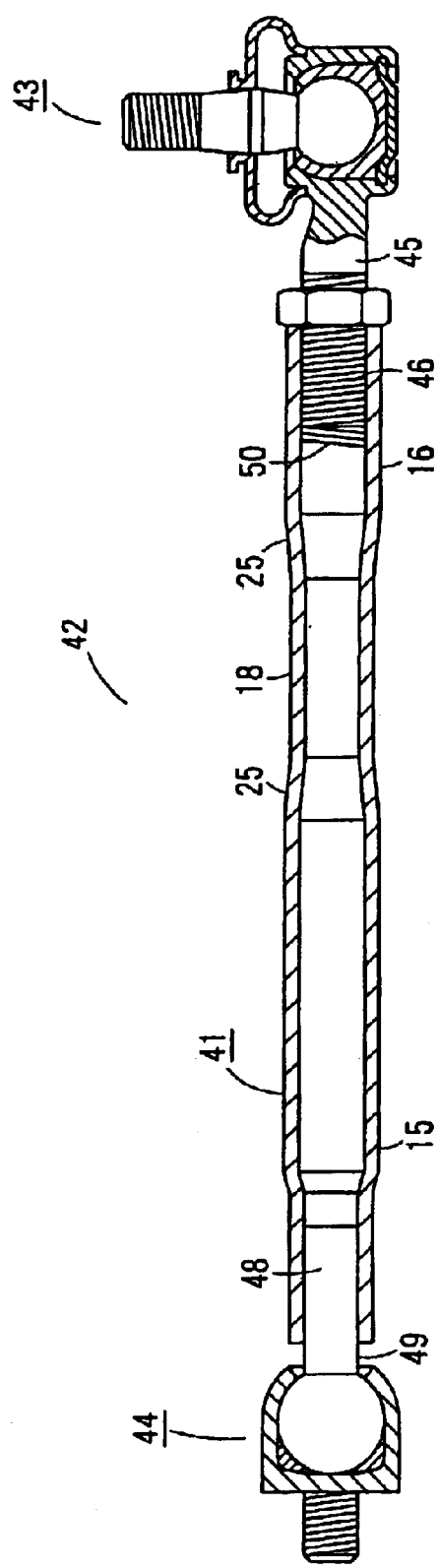
FIG. 3 is a side view of a connecting device provided with an arm produced by an arm production method according to another embodiment of the present invention.

Although the invention is explained referring to the above embodiment, which may serve as a part of a suspension arm with the shaft-supporting potions 2,3 respectively connected to the two ends of the arm, the invention is applicable to an arm of any type, including a tie rod 41 of a steering device shown in FIG. 3.

The connecting device 42 shown in FIG. 3 has the same structure as the embodiment shown in FIGS. 1 and 2, except that the connector portion 4 to be connected to the shaft-supporting potion 2 is a ball joint 43, and that the other shaft-supporting potion, i.e. the shaft-supporting potion 3, is another ball joint 44. The ball joint 43 has an arm portion 45 projecting therefrom. An external thread portion 46 is formed along the cylindrical outer surface of the arm portion 45. The ball joint 44 has a ball stud 49, which includes a stud portion 48 in the shape of a solid cylinder. According to the present embodiment, the arm is the tie rod 41 and constitutes a part of a steering device. The tie rod 41 has a first connecting portion 15 at one end thereof and a second connecting portion 16 at the other end. Formed in the internal surface of the second connecting portion 16 of the tie rod 41 are internal threads 50 to be engaged with the external thread portion 46 of the arm portion 45 of the ball joint 43. The stud portion 48 of the ball joint 44 is attached to the first connecting portion 15 of the tie rod 41 by inserting the stud portion 48 into the first connecting portion 15 and narrowing the first connecting portion 15 by pressure-clamping or any other appropriate means.

In addition to the connecting device 42 shown in FIG. 3 and the connecting device 1 shown in FIGS. 1 and 2, the invention is applicable to any arm, provided that an adaptor portion and a connectable member are connected to the arm with a given distance between the adaptor portion and the connectable member and that the arm includes a buckle portion 18 arranged to buckle when receiving a load of more than a given value.

The embodiment shown in FIGS. 1 and 2 calls for connecting the shaft-supporting potion 2 to the arm 5 via the connector portion 4. However, the connecting arm portion 10 of the shaft-supporting portion 2 may be provided with internal threads to be engaged with the external threads of the second connecting portion 16 of the arm 5 so that the connecting arm portion 10 of the shaft-supporting portion 2 can be directly connected to the arm 5.

Although the embodiment shown in FIGS. 1 and 2 includes a stepped portion 20, the stepped portion 20 may be omitted. Or, in an alternative structure, stepped portion 20 may be provided contiguous with the second connecting portion 16.

POSSIBLE INDUSTRIAL APPLICATION

As described above, an arm production method according to the invention is applicable to producing an arm that may be used for a suspension arm of an automobile or a tie rod of a steering mechanism.

What is claimed is:

1. An arm production method for producing a cylindrical arm which will be connected to an adaptor portion and a connectable member and includes:
    a tubular first connecting portion provided at one end of the arm and adapted to be connected to said adaptor portion,
    a tubular second connecting portion provided at the other end of the arm and adapted to be connected to said connectable member, and
    a buckle portion which is smaller in diameter than the first connecting portion as well as the second connecting portion and provided between the first connecting portion and the second connecting portion so as to buckle when a load greater than a given value is applied to the first connecting portion or the second connecting portion,
    said method comprising steps of:
        forming an unfinished body by narrowing one end portion of a tubular material that has a diameter corresponding to that of either one of the first connecting portion or the second connecting portion so as to form said one end portion into a small diameter portion having a diameter corresponding to that of said buckle portion, and
        radially enlarging the portion between the end of the slender portion of the unfinished body and the portion of the slender portion to be formed into the buckle portion so as to increase the diameter to correspond to the diameter of the other one of the first connecting portion or the second connecting portion.

2. An arm production method as claimed in claim 1, wherein:
    the first connecting portion and the second connecting portion have different diameters, and
    the arm production method calls for use of a material having a diameter that corresponds to the greater of the diameters of the first connecting portion and the second connecting portion.

3. An arm production method as claimed in claim 1 or claim 2, wherein: a stepped portion having a tubular shape with a diameter greater than the buckle portion is formed between the buckle portion and at least one of the two connecting portions, i.e. the first connecting portion and the second connecting portion, by narrowing the corresponding portion or portions of the material.

4. An arm production method as claimed in anyone of the claims from claim 1 or 2, wherein:
    the first connecting portion and the second connecting portion have different diameters, and
    external threads to be engaged with either one of the adaptor portion or the connectable member are formed along the cylindrical outer surface of the connecting portion that has the smaller diameter.

* * * * *

UNITED STATES PATENT AND TRADEMARK OFFICE
CERTIFICATE OF CORRECTION

PATENT NO. : 6,745,610 B2
DATED : June 8, 2004
INVENTOR(S) : Shigeo Takeuchi

It is certified that error appears in the above-identified patent and that said Letters Patent is hereby corrected as shown below:

Column 5,
Lines 14, 15, 20, and 23, change "potion" to -- portion --
Lines 26 and 29, change "potions" to -- portions --
Linr 52, chagne "sahll" to -- shall --

Column 6,
Line 31, change "potion" to -- portion --
Line 57, change "potions" to -- portions --

Column 7,
Line 5, change "potions" to -- portions --
Line 12, change "potion" to -- portion --
Line 13, change "potion" in both occurrences to -- portion --
Line 40, change "potion" to -- portion --

Column 8,
Line 49, change "anyone" to -- any one --

Signed and Sealed this

Twenty-first Day of December, 2004

JON W. DUDAS
*Director of the United States Patent and Trademark Office*